UNITED STATES PATENT OFFICE.

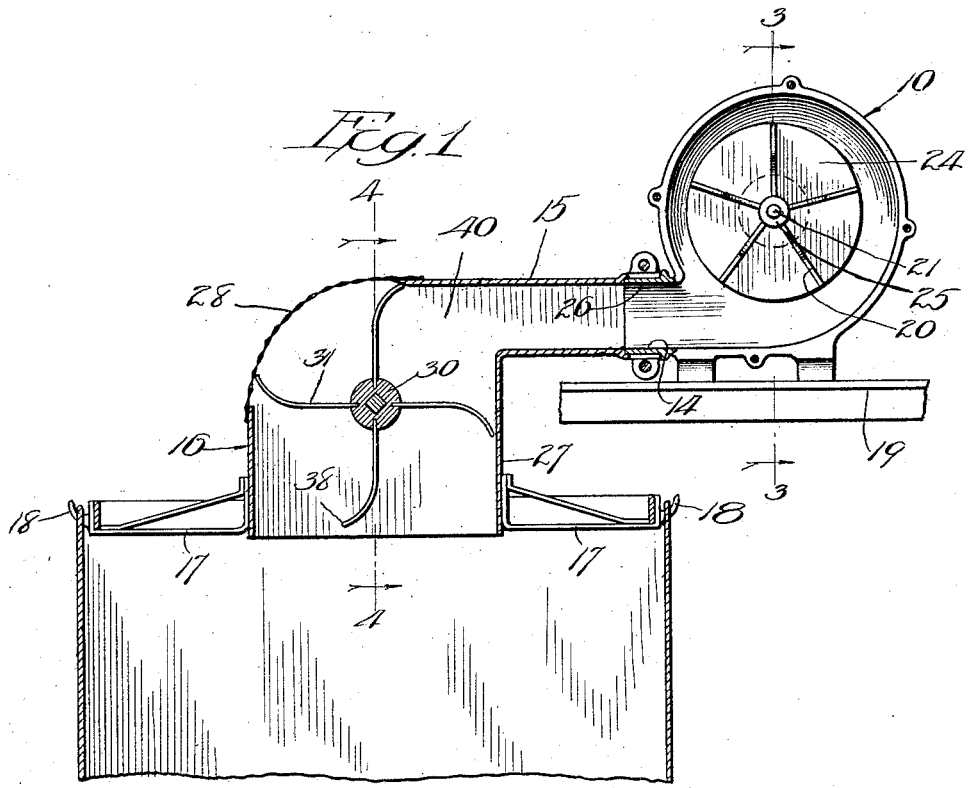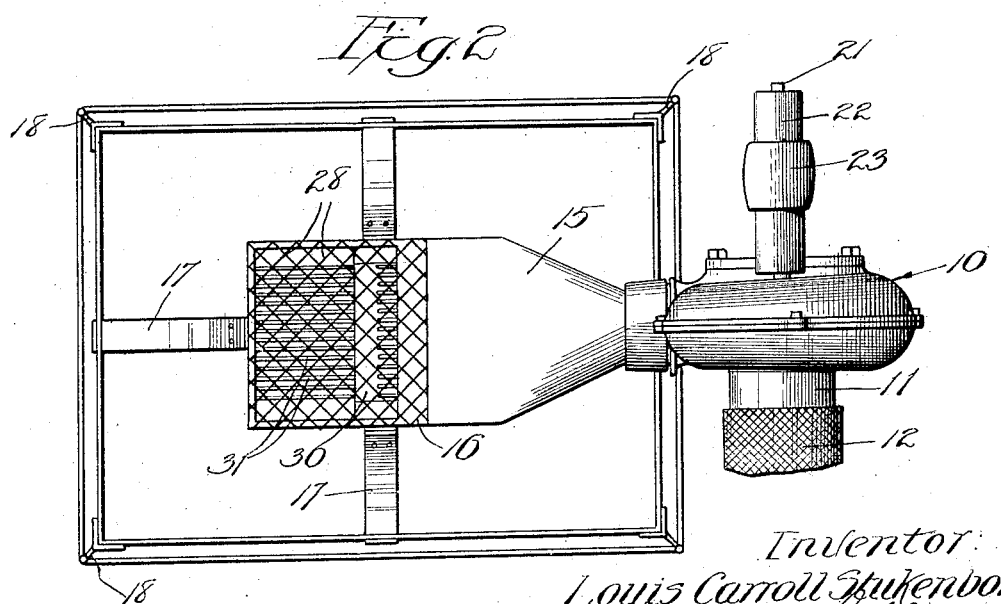

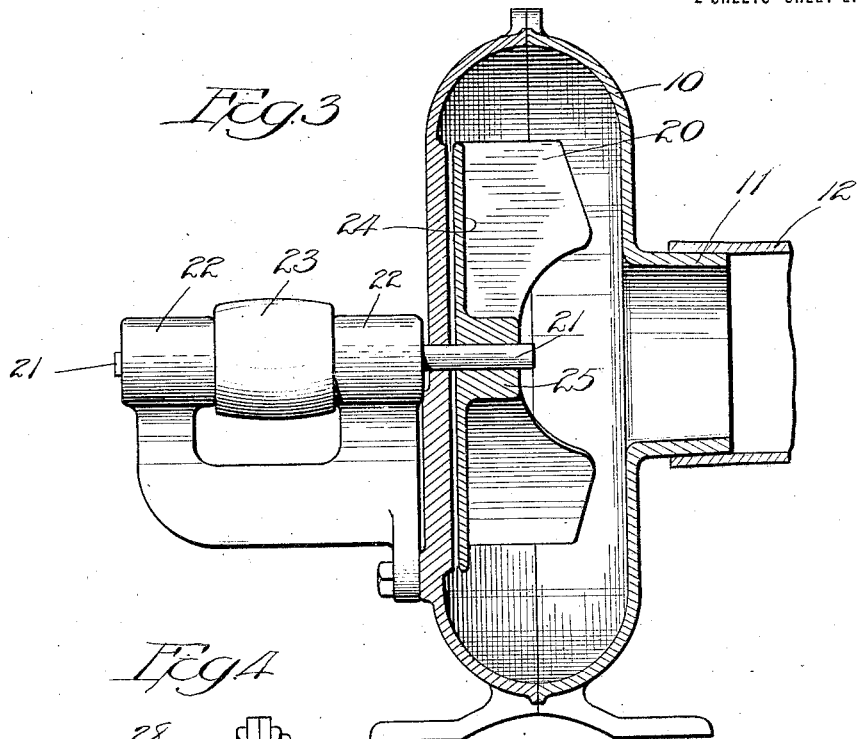
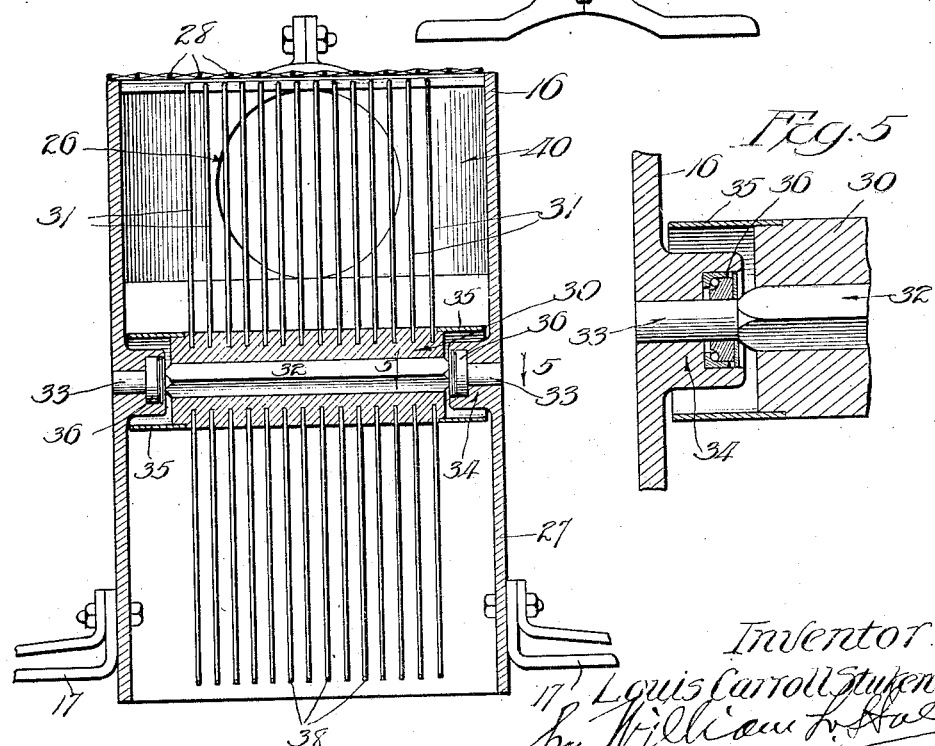

LOUIS CARROLL STUKENBORG, OF CHICAGO, ILLINOIS, ASSIGNOR TO FREDERICK W. STUKENBORG, OF CHICAGO, ILLINOIS.

CONVEYING AND CLEANING MECHANISM FOR COTTON.

1,417,782.  Specification of Letters Patent.  Patented May 30, 1922.

Application filed February 10, 1919. Serial No. 276,049.

*To all whom it may concern:*

Be it known that I, LOUIS CARROLL STUKENBORG, a citizen of the United States, and a resident of Chicago, in the county of Cook and State of Illinois, have invented certain new and useful Improvements in Conveying and Cleaning Mechanism for Cotton; and I do hereby declare that the following is a full, clear, and exact description thereof, reference being had to the accompanying drawings, and to the characters of reference marked thereon, which form a part of this specification.

This invention relates to improvements in machines for conveying and cleaning cotton, and is herein shown as adapted to cotton picking machines of the suction type, such, for instance, as is shown in my prior United States Letters Patent Number 1,264,575 granted April 30, 1918, although it may be applied to machines of other types.

The invention relates more particularly to an improved blower for creating suction to convey the cotton rearwardly through an appropriate conduit, and also to means located in the path of the moving cotton for separating dirt therefrom and thereby cleaning the cotton.

The invention consists in the combination and arrangement of the parts shown in the drawings and described in the specification, and is pointed out in the appended claims.

Among the objects of the invention is to provide an improved construction of blower for the double purpose of creating a suction for moving the cotton through the machine and for passing the cotton through the blower without clogging the blower.

Another object of the invention is to provide means in the path of the moving cotton for separating the leaves, boll dirt, and foreign substances from the cotton fibre so that the cotton is discharged from the mechanism free from such foreign substances.

Other objects of the invention are to improve and simplify cotton conveying mechanism.

In the drawings,—

Figure 1 is a vertical section showing one practical adaptation of my improvements.

Figure 2 is a plan view thereof.

Figure 3 is a section on the line 3—3 of Figure 1 in the direction indicated by the arrow.

Figure 4 is a section on the line 4—4 of Figure 1.

Figure 5 is an enlarged sectional detail on the line 5—5 of Figure 4.

As shown in the drawings, 10 designates as a whole the blower casing provided with a central inlet 11 that is connected to a flexible tube 12 which, if the mechanism be employed in the type of machine shown in my aforesaid prior patent, leads from the picker head to the blower. 14 designates the outlet of the blower that is connected by a conduit 15 with a cleaning chamber 16. Said cleaning chamber opens downwardly and is adapted to be supported by or in fixed relation to a hanger frame 17 which may be supported in any suitable manner on the machine frame and is provided with hooks 18 to suspend a sack which receives the cotton from the conveying and cleaning mechanism.

The blower may be supported on any suitable frame structure 19 of the machine. 20 designates the blower blades or vanes that are fixed to and rotate with a central shaft 21 which extends outside the casing at one side thereof and is rotatively mounted in bearings 22 of a side bracket and provided with a driving pulley 23. The said blades are herein shown as formed on and extended laterally from a plate 24, parallel with and adjacent to one wall of the blower casing, 10 and which is formed integral with the hub 25 that is fixed to the shaft 21.

In accordance with one phase of my invention, the blades are free or unsupported at their ends adjacent to the inlet 11 of the blower so as to provide unhampered space at the receiving side of the blades to receive the cotton from the inlet and to avoid the presence of parts in the path of the moving cotton against which the cotton would tend to cling in a manner to clog the blower.

In accordance with another phase of the invention, the blades are of such length, relatively to the dimensions of the case and to the outlet 14, that said blades when occupying vertical positions below the shaft 21 extend with their ends below the plane of the upper wall or ceiling 26 of the outlet. I have found that this relative arrangement of the blades and the outlet has the effect to enable the blades to effectively clear themselves of the cotton and to prevent the cotton being thrown upwardly past the outlet and winding about the blades and their bearings. This is due to the fact that the impact of the blades against the cotton as it enters the blower tends to throw the cotton outwardly towards the outlet in a straight line, and the tendency of the cotton to cling to the blades and to turn therewith is overcome. The efficient passage of the cotton through the blower is also facilitated by the absence of parts at the inlet edges of the blades to which the cotton may tend to cling, it being observed that the cotton is free to enter the spaces between the blades directly from the inlet side of the blower.

The conduit 15 connects directly with the cleaner casing 16. The wall of the conduit 15 and that of the downturned portion 27 of the casing 16 are solid or imperforate. The wall of the casing at the outer angle between the downturned portion of the casing and the conduit is perforated. This may be effected in any suitable manner, as by perforating the metal of the wall, or the wall may be cut away and a screen or netting 28 applied thereover. This perforate portion of the wall is located in the direct line of the path of the moving body of air as it leaves the blower. Located through said cleaner casing is a rotative separating device which comprises a core 30 and a plurality of generally radial arms 31, herein shown as made of wire. Said core, which may be made of wood or like fibrous material, is mounted on a shaft 32 which may be squared to be seated in the squared axial opening of the core, and said shaft is provided with cylindric bearing portions 33 that are mounted in bearing bosses 34 shown as formed integral with the side walls of the casing 16. Preferably and as herein shown, the said bosses 34 are overlapped by shells 35 that project endwise from the core 30 to protect the shaft, and antifriction bearings, designated as a whole by 36, between the shaft and the bosses 34, from the entrance of cotton thereto which would otherwise tend to wrap about the bearings. The said arms 31 are arranged in a plurality of series which extend lengthwise of the core, and the terminals 38 of said arms are preferably curved or bent rearwardly with respect to the direction of rotation of the rotative separator. The arms are made of such length that, when the separator is rotated, they lightly engage the perforated or screen like portion 28 of the casing wall.

The shaft of said rotative separator is located below the plane of the axis of the conduit 15 which connects the outlet side of the blower with the casing. As a result of this construction the cotton which is forced into the casing from the blower strikes said arms and causes the separator and cleaner to rotate. The separation of said arms permits the air to pass freely through the blades formed by the several sets of arms and, inasmuch as the perforated area 28 of the casing is located in line with the air current, the said current carries the boll dirt, particles of leaves, and other foreign matter away from the cotton and discharges them through the perforated wall, the perforations of which are of such size as to permit the foreign particles to be freely discharged therethrough from the casing. The rapid rotation of the series of blades formed by the spaced arms directs the cotton downwardly through the vertical discharge side of the cleaner casing, from whence the cotton falls into the sack below, which is suspended on the frame 17. Ordinarily the force of the air current, combined with the impact of the cotton against the open blades, will be sufficient to rotate the cleaner device so as to effectively discharge the cleaned cotton from the cleaner casing after the foreign particles have been separated therefrom.

With the construction described I have found that cotton as it is carried backwardly from the picker head, or other source from which the cotton may be derived, is carried freely through the blower without liability of clogging the blower, and that the cleaner mechanism, embracing the rotative separating device and the perforated cleaner casing, serves to separate all of the loose dirt which, by the picker mechanism and by the blower, has been opened or brought to a fluffy condition favorable for the elimination of the dirt from the cotton fibre. So far as the broader features of the invention are concerned, the cleaner device may be located at a distance further from the blower than indicated in the drawings. The said cleaner casing may be supported on the machine in any suitable manner, depending upon the type of machine employed, and the frame 17 for suspending the sack may be likewise connected to any suitable rigid portion of the machine.

I claim as my invention:

1. In cotton conveying means, a blower comprising a casing having a central inlet and a tangential outlet, a shaft rotatively mounted in said casing, a plate fixed to said shaft on the sides of the casing remote from the said inlet, and blades carried by said plate and extending towards the inlet opening without obstruction so as to leave spaces between the blades for cotton from said inlet.

2. Cotton conveying and cleaning means comprising a blower, a casing having an inlet, and a tangential outlet, blades rotatably mounted in the blower, the outlet being so related to the blades that the terminals of the blades intersect a plane coincident with one side of the outlet, a casing, a tangential inlet therefor in line with and connected directly to said outlet and a rotative element in said casing against which the cotton is discharged from the blower, said latter casing being provided on its side directly opposite to the blower outlet with a perforated wall.

3. Cotton conveying and cleaning means comprising a blower, a casing having an inlet, and a tangential outlet, blades rotatably mounted in the blower, the outlet being so related to the blades that the terminals of the blades intersect a plane coincident with one side of the outlet, a conduit in line with and leading from said blower outlet, a casing to which said conduit directly leads, having a perforated wall opposite to said conduit, and a rotary separating device in the latter casing operating in close contact with said perforated wall.

4. Cotton conveying and cleaning means comprising a conduit terminating in a downwardly opening casing, blast means for moving air and cotton through said conduit and casing, the casing wall opposite to said conduit being perforated, and a freely rotatable, open bladed separator within said casing between the conduit and perforated wall and adapted to be driven by the blast and suspended cotton driven through said conduit, the terminal of said blades operating in close contact with said perforated wall.

5. Cotton conveying and cleaning means comprising a conduit terminating in a downwardly opening casing, blast means for moving air and cotton through said conduit and casing, the casing wall opposite to said conduit being perforated, and a freely rotary, open bladed separator within said casing between the conduit and perforated wall, the terminals of said blades operating in close contact with said perforated wall, a frame surrounding the open, down-turned portion of said casing, and hooks on the frame from which to suspend a cotton receiving sack.

6. Cotton conveying and cleaning means comprising as a unitary structure, a conduit constituting the tangential outlet of a blower casing and an inlet of a cleaning casing, said blower casing having a central inlet, blades rotative therein and unobstructed toward said inlet and intersecting at their ends a plane below the top of said conduit, said cleaning casing having a down-turned outlet and provided in its port in line with said conduit with a perforated wall, and a rotative open-work bladed separator device in the cleaning casing between its inlet and its outlet and operating with its blades in cleaning contact with said perforated walls.

7. Cotton conveying and cleaning means comprising a unitary structure, a conduit constituting the tangential outlet of a blower casing and an inlet of a cleaning casing, said blower casing having a central inlet, blades rotative therein, and unobstructed toward said inlet and intersecting at their ends a plane below the top of said conduit, said cleaning casing having a down-turned outlet and provided in its part in line with the conduit with a perforated wall, and a rotative open-work bladed separator device in the cleaning casing between its inlet and its outlet and operating with its blades in clearing contact with said perforated walls, said separating device rotating on an axis below the plane of the lower wall of said conduit.

In testimony whereof I claim the foregoing as my invention, I hereunto append my signature at Chicago, Illinois, this 7th day of February, 1919.

LOUIS CARROLL STUKENBORG.